March 7, 1933.　　H. W. BUELOW ET AL　　1,900,541
STRUCTURAL ELEMENT
Filed July 1, 1931　　3 Sheets-Sheet 2
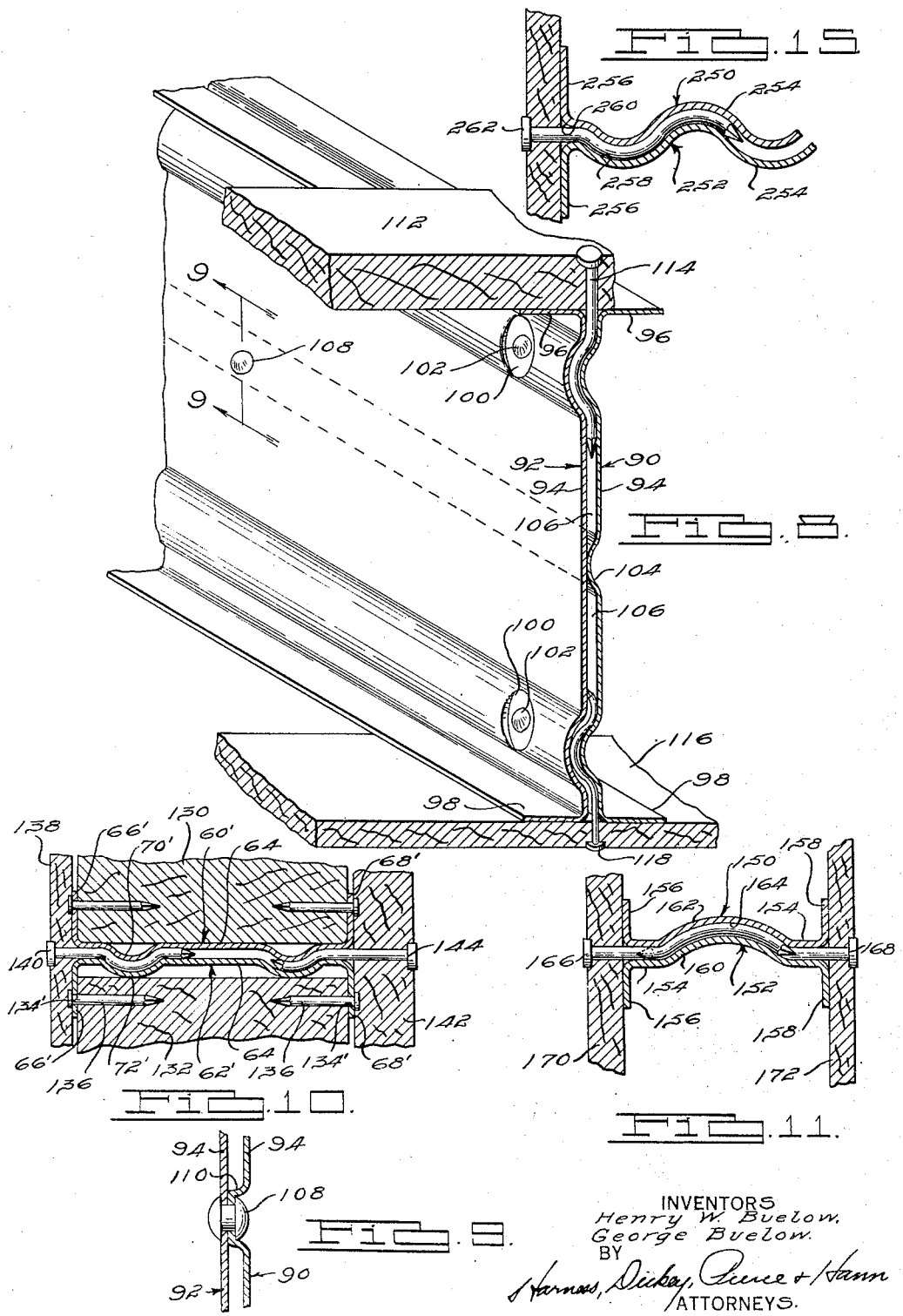
INVENTORS
Henry W. Buelow,
George Buelow.
BY
Harness, Dickey, Pierce & Hann
ATTORNEYS.

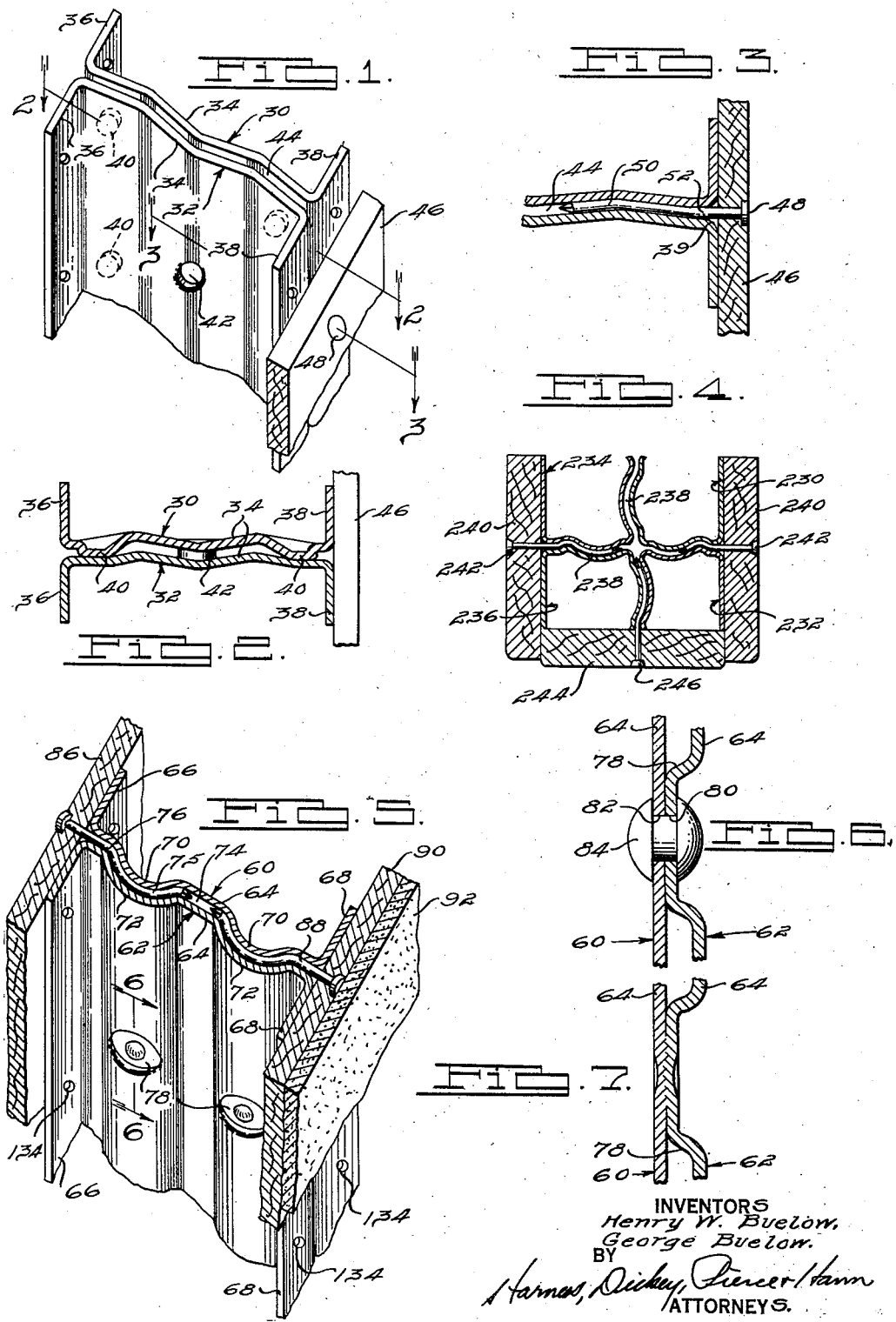

March 7, 1933. H. W. BUELOW ET AL 1,900,541
STRUCTURAL ELEMENT
Filed July 1, 1931 3 Sheets-Sheet 3
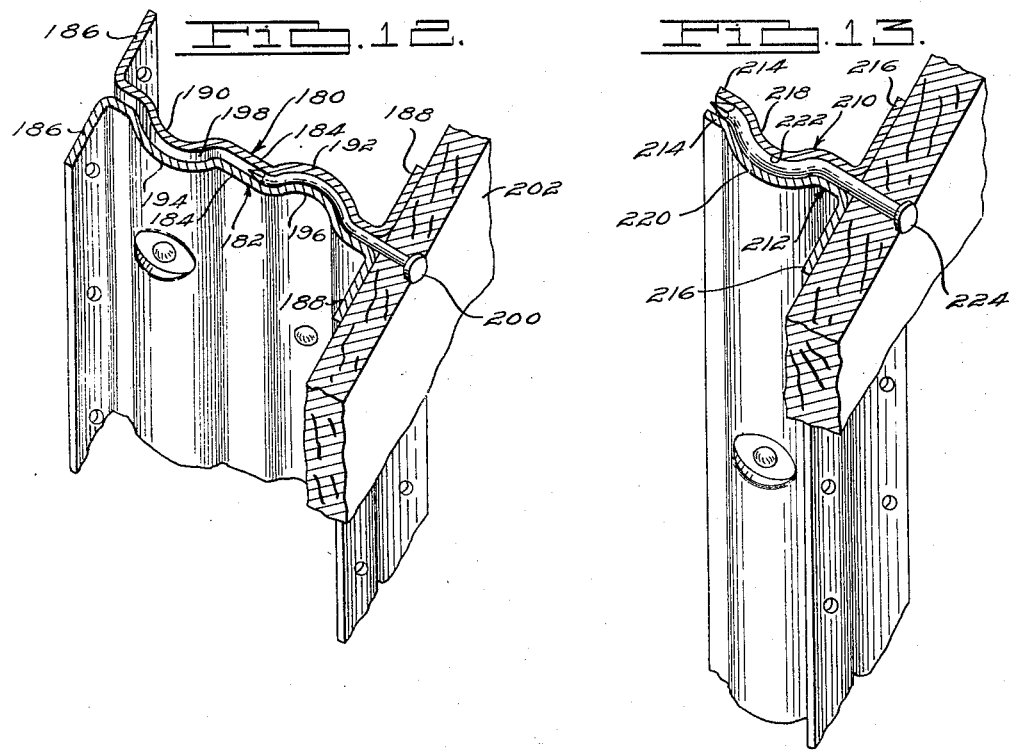
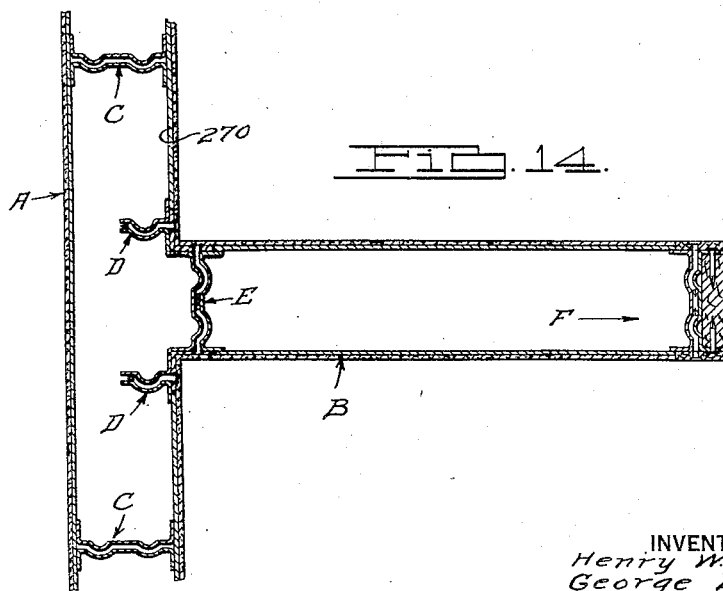
INVENTORS
Henry W. Buelow,
George Buelow.
BY
/ATTORNEYS.

Patented Mar. 7, 1933

1,900,541

UNITED STATES PATENT OFFICE

HENRY W. BUELOW, OF ROYAL OAK, AND GEORGE BUELOW, OF DETROIT, MICHIGAN

STRUCTURAL ELEMENT

Application filed July 1, 1931. Serial No. 548,134.

This invention is a continuation in part of our application for Letters Patent of the United States for improvements in structural elements, filed April 23, 1930, Serial No. 446,497, and relates to structural elements and particularly to those types of structural elements commonly employed in connection with the construction of residences or other buildings, and including for instance such structural elements known in wood structure terminology as studs, joists, rafters, scantlings and the like, the principal object being the provision of structural elements of this type formed from sheet or plate metal.

Other objects of the invention are to provide a sheet metal structural element of the type described which, to all intent and purposes, will be the full equivalent as far as rigidity, load carrying capacity, and ability and manner of attaching members thereto as the corresponding wooden members now conventionally employed; and to provide a metal structural element of the class described which will be light in weight, economical to make and relatively economical to use from the building owner's standpoint.

Other objects of the invention are to provide a sheet metal structural element of the type described having supporting faces equivalent to those provided by corresponding wooden elements; to provide a sheet metal structural element of the type described into which a nail or equivalent securing means may be driven by a hammer with substantially the same ease in substantially the same manner as nails are driven into corresponding wooden structural elements; to provide a structural element of the type described of such a conformation as to particularly adapt it for cooperation with wooden or other members which it is desired to associate therewith; to provide a sheet metal structural element of the type described which is capable of receiving and efficiently retaining a variety of sizes and lengths of nails or like elements; to provide a structural element of the type described from which nails may be removed with substantially the same ease and in substantially the same manner as nails are removed from equivalent wooden elements; to provide a sheet metal structural element of the type described which eliminates to a great extent the necessity of unusual accurateness in the location of the nail or equivalent members which are to be driven into the same; and to provide a structural element of the type described particularly adapted for cooperation with like members or elements in the fabrication of a completed structure.

Other objects of the invention are to provide a sheet metal structural element including a pair of sheet metal parts each of which includes a flange and a web, said parts being secured together in back-to-back and spaced relation, with the flanges thereof forming a supporting face, and the webs thereof cooperating to form between them a sinuous recess or groove for the reception and retention of a nail or similar fastening element; to provide a structural element of the type described in which each of said parts is provided with a radius at the point of junction of their respective webs and flanges whereby to form guiding surfaces for the nails during their passage into the groove or recess between the webs; to provide a structural element of the class described in which the nail or other fastening element is reversely bent laterally, when driven thereinto, by an amount at least as great as the diameter of the nail; to provide a structural element of the class described in which the groove or recess formed between the parts begins its curved conformation from a point substantially in the plane of the flanges; to provide bosses or stools integral with said parts for automatically controlling the spaced relation thereof; to provide such parts with openings coincident with at least a portion of said bosses or stools, for the passage of securing means for securing the two parts together; and to provide such bosses or stools of such a shape as to present a relatively small area of obstruction in the recess or groove for the passage of a nail and of such a shape as to deflect any nail that may come in contact therewith without interfering with the holding power of the nail.

The above being among the objects of the present invention, the same consists in certain features of construction and combinations of parts to be hereinafter described with reference to the accompanying drawings, and then claimed, having the above and other objects in view.

In the accompanying drawings, which illustrate suitable embodiments of the present invention, and in which like numerals refer to like parts throughout the several different views, Figure 1 is a fragmentary perspective view of a sheet metal structural element constructed in accordance with the present invention, and equivalent to what is known as a stud in wood structure terminology, a fragment of a board, plaster board, lath or other like member being shown secured thereto by means of a nail.

Fig. 2 is a transverse sectional view of the element shown in Fig. 1, and taken as on the line 2—2 of Fig. 1.

Fig. 3 is a fragmentary enlarged transverse sectional view taken on the line 3—3 of Fig. 1 and illustrating the cooperation between the nail and the member.

Fig. 4 is a sectional view taken transversely of the length of a modified form of structural element constructed in accordance with the present invention and particularly adaptable for use in door casings and the like.

Fig. 5 is a view similar to Fig. 1 of a modified form of structural element, and illustrates siding secured to one face thereof by means of nails, and lath or plaster board secured to the opposite side thereof by means of nails, the lath or plaster board being covered with a coating of plaster.

Fig. 6 is an enlarged fragmentary sectional view taken as on the line 6—6 of Fig. 5 and illustrating with greater clearness the spacing bosses employed for maintaining the two parts of the element in proper spaced relation, and the means for maintaining the two parts of the element together.

Fig. 7 is a view similar to Fig. 6 but illustrating the two parts of the element as being welded together.

Fig. 8 is a fragmentary perspective sectional view taken transversely to the length of a modified form of our structural element particularly adaptable for use as a joist, the view also illustrating the employment of nails of different diameters for securing members thereto.

Fig. 9 is a fragmentary sectional view taken on the line 9—9 of Fig. 8.

Fig. 10 is a transverse sectional view of an element such as that disclosed in Fig. 5 and illustrating how members of different thicknesses may be secured thereto by nails of the same length, and also illustrating the manner in which the element may cooperate with wooden filler members received on either side thereof without tending to cause the filler members to cock or tilt with respect thereto.

Fig. 11 is a transverse sectional view of a modified form of our structural element particularly adaptable for use in places where only a small depth of such element is required, and illustrating the manner in which nails driven from opposite sides thereof may overlap, in end view of the element.

Fig. 12 is a view similar to Figs. 1 and 5 but illustrating a modified form of element in which each of the two parts thereof may be formed by the same dies or rolls.

Fig. 13 is a fragmentary perspective sectional view of a modified form of our structural element, corresponding to what may be termed a half stud in wood structure terminology, and showing a fragment of a member secured in place thereto by means of a nail.

Fig. 14 is a more or less diagrammatic fragmentary horizontal sectional view of two intersecting vertical walls, and illustrating the use of the elements of the present invention in connection therewith.

Fig. 15 is a fragmentary sectional view taken transversely through the length of a slightly modified form of structural element in which a nail is caused to be bent substantially from the moment of penetration.

We are aware that it has heretofore been suggested to form metallic structural elements of the type herein referred to, and even to form such elements from two channel-shaped parts secured in back-to-back relation and arranged to provide a groove between them into which a nail may be driven and be bent during its passage thereinto for the purpose of retaining the nail in place, and we are further aware that it has been suggested to make structural elements of this general type from sheet metal. However, in the structures heretofore proposed there have been, in each case, some drawback which has prevented such structure from being commercially practicable, either from the standpoint of cost of manufacture, or ability to receive with proper ease and retain the nails driven thereinto. In some of the constructions heretofore proposed and which would efficiently retain a nail when driven into the same, the structure has either necessitated the use of rolled metal sections, as differentiated from sheet metal, which results in an excessively expensive construction, or else their construction has limited them to the reception of a certain diameter or a predetermined length of nail, which thus introduces a complication in the use of the element in actual building construction which is substantially impossible to overcome. In other constructions heretofore proposed and formed from sheet metal, although they may be capable of receiving different size and length of nails, we have found that the nails thus driven into them are not retained therein with sufficient security to make them practical for all uses. In some of the heretofore proposed constructions where the nail is bent in being driven home, it is merely bent in one direction along a generally curved path, whereas we have found that if a nail is to be retained in such element with the same security as it would be retained in a corresponding wooden element, then the nail must be first bent in one direction and then in another direction and preferably by an amount at least equal to the diameter of the nail. In such case we find that a nail when driven into such an element is retained therein with substantially the same security as when driven into an equivalent wooden member, and in addition, where necessary, such nails may be removed by a claw hammer by the exertion of substantially the same force as would be necessary in removing the nail from an equivalent wooden member. Incidentally this feature of being able to remove a nail from the element is of material importance when it is understood that such elements must often be held in temporary position my means of braces or the like during the fabrication of a building, and when such braces are removed it is desirable to remove the nails which were employed to secure them to the element.

In accordance with the present invention we have provided a structural element which may be formed from relatively thin sheet metal by a suitable die or rolling process, thereby resulting in an element not only cheap in cost of material involved but also economical to fabricate. This element is provided with a relatively broad supporting face for association with boards, plaster board, laths or other members to be secured thereto, thus acting to definitely locate such members and tending to rigidly maintain them in proper alignment with such surface, and further provides in such element between the two parts thereof a nail receiving groove, slot or recess which, when a nail is driven thereinto, will cause the nail to be first bent in one direction and then in another direction, thereby introducing a kink or bend into the nail which so cooperates with the walls of the groove, slot or recess as to securely maintain the nail in position. This bending of the nail first in one direction and then in another direction to produce a kink in the same, permits the use of nails of different lengths and different diameters without materially effecting the holding power of such nails, thereby making such structural element substantially universal within reasonable limits, as far as length and diameter of nails employed in connection therewith are concerned.

Referring to Figs. 1, 2 and 3, a structural element is shown which corresponds to what is generally known in wood structure terminology as a stud, and which in wooden structures is commonly formed of a two-by-four. As indicated in these figures this element is made up of two main parts generally indicated as at 30 and 32 respectively. Each of these two main parts is made up in generally channel-like form to include a web 34 and end flanges 36 and 38 respectively. These end flanges lying in parallel planes and preferably being joined to their corresponding webs by a curved corner edge as at 39 in Fig. 3. The general plane of the webs 34 are perpendicular to their respective flanges 36 and 38, but it will be noted that substantially no part of these webs are actually coincident with such general plane, but instead adjacent portions in the direction of depth of the web are bent first in one direction and then in the opposite direction, or corrugated, as in a washboard, and the webs of the two members 30 and 32 are bent so that their opposed faces are complementary to each other. The webs of one or both of the members 30 and 32 (in Fig. 2 shown as the member 30 only) are provided with laterally projecting stools or bosses 40 pressed out from the metal of the web and adapted to contact with the web of the opposite member so as to space the web of such opposite member therefrom. The respective webs of the opposite members are secured together in spaced relation predetermined by the height of the stools or bosses 40 by any suitable means so as to form the two members 30 and 32 into a single unitary structural element. The particular means shown in Figs. 1 to 3 inclusive for securing the members 30 and 32 together comprises bosses or stools 42 provided in the web 34 of one of the members 30 and 32 approximately midway between the flanges 36 and 38 thereof, at spaced intervals longitudinally of the element. These bosses 42 are shown as being welded to the opposite member, although other means for securing them to such member may be employed.

From the above it will be apparent that due to the peculiar bent formation of the webs 34 and the complementary arrangement thereof, in being secured together in spaced relation they form between them, in sectional view, a sinuous or serpentine slot, groove or recess 44 which opens on opposite faces of the element, and that the slot 34 extends in substantially unbroken relation between the opposite flange faces of the element from one end thereof to the opposite end thereof. In practice, the height of the bosses 40 and 42 are so proportioned with respect to the size of the element and the uses to which it is to be put as to be capable of freely receiving nails of the maximum diameter that will ordinarily be employed in conjuncion therewith.

As will be obvious, the slot 44 is provided solely for the reception of nails to be employed for securing other members or elements to this structure, and in practice where a member such as 46 in Figs. 1, 2 and 3, and which may comprise a board, wall board, plaster board, lath or any other similar member, is to be secured to either flange face of this structural element, one or more nails such as 48 is simply driven through the member 46 and into the slot 44, until the head of the nail is flush with the outer surface of the member 46 and the member 46 is drawn into firm engagement with the corresponding flange face of the element. At this point it may be noted that the curved edges 39 at the junction of the webs and flanges of the members 30 and 32, provide an outwardly flared mouth for the slot 44 which serves to guide the point of the nails into the slot, thus making it unnecessary that extreme accuracy be employed in aligning the nails with the slot prior to driving them through members such as 46.

As will be apparent and as illustrated in Fig. 3 the nail 48 in entering slot 44 is first bent laterally of the element in one direction and then laterally of the element in the opposite direction producing a kink or bend 50 in the nail corresponding with the corresponding bend in the slot 44.

The result is that before the nails 48 may be removed from the element, sufficient force must be exerted not only to straighten out the nail but, more important, to cause the nail to be continuously bent successively from its first point of bend to the point of the nail during such withdrawal. Consequently, the nail is retained in the element in such a manner that a considerable force must be exerted to cause displacement thereof.

In the construction shown in Figs. 1, 2 and 3, the corrugated or washboard effect of the web of the elements 30 and 32 is obtained by the provision of a plurality of substantially plane surfaces extending longitudinally of the structural elements and disposed angularly relative to each other and to the general plane of the web transversely of its length. While this construction is satisfactory from a practical standpoint, it will be apparent that where a nail such as 48 is driven into the element a distance such as indicated in Fig. 3, the nail when fully driven in is bent substantially only at two points, namely at the point 50 and also at the point 52 where the first bending of the nail occurs as it is being driven into the element. We have found that if the slot between the web is formed to substantially continuously bend the nail over its received length, as by corrugating the webs of the member by the use of smooth curves, not only will the nail have a greater holding power when properly received in the slot, but certain economies in manufacture result. Such a construction is illustrated in Fig. 5, which shows a member or structural element equivalent to that illustrated in Figs. 1, 2 and 3 and which comprises the oppositely disposed channel members 60 and 62 each of which comprises a web portion 64 and end flanges 66 and 68 respectively. The element in this particular case is illustrated of a size corresponding to the usual two-by-four employed in wood structure terminology and accordingly, the web 64 of the part 60 is provided with two outwardly bent portions 70 of gently and gradually curved formation. These portions 70 are disposed on opposite sides of the centerline of the web 64, in proximity to the corresponding flanges 66 and 68 which they parallel. The web 64 of the part 62 is provided with a pair of inwardly bent complementary curved portions 72 so that when the parts 60 and 62 are assembled together in spaced relation as hereinafter described, the slot 74 provided therebetween is of a gently, but substantially constantly curved formation over the major portion of its length. Consequently, when a nail such as 75 has been driven into it in the manner indicated, such nail, in order to be withdrawn, must be continuously and successively bent from the first point of bend 76, to the point of the nail. This feature, particularly where the degree of bend of the slot 74 is such that the nail is bent laterally in one direction and then the other an amount greater than the diameter of the nail, as is preferable in all cases, provides a construction which retains the nail in the element with a maximum amount of security and yet, due to the gently and gradually curved formation of the slot 74, permits the nail to be driven into the slot with comparative ease and permits satisfactory removal thereof with a claw hammer or equivalent tool when necessary or desirable.

It may be noted in connection with Fig. 5 that those portions of the web 64 of the parts 60 and 62 not actually included in the curved portions 70 and 72 and immediately adjacent their edges, lie in a plane perpendicular to the edges of the flanges 66 and 68. The advantage of this feature will be pointed out later in connection with another figure.

The construction of the spacing bosses or stools 78 illustrated in Fig. 5 are slightly different from the corresponding parts in the previously described figures. In Fig. 5 the bosses 78 are struck inwardly from the bottom of the curved portion 72, it being understood that such bosses are provided in spaced relation longitudinally of the structural element, and in this particular case the bosses 78 are relatively narrow longitudinally of the elements and their opposite ends, in a direction transverse to the length of the element, are made relatively narrow, so that should a nail in being driven into the element happen to strike one of the bosses it will be easily deflected either one way or the other, and its proper penetration into the slot 74 will not be materially affected. Furthermore, as best illustrated in Fig. 6 the bosses 78 are provided with a central opening 80, and the web of the part 60 is provided with openings 82 aligned therewith, and rivets 84 are extended through the aligned openings 80 and 82 for the purpose of securing the two parts 60 and 62 together.

Incidentally, it may be noted in Fig. 5 that a conventional arrangement of members supported by a stud is illustrated. In other words the face of the stud provided by the flanges 66 has secured thereto members 86, which may be ship-lap, wall board, insulating board, or other suitable material commonly employed as in exterior sheathing for a residence or other buildings, and secured in place by the nails 75, while the opposite supporting face provided by the flanges 68 have secured thereto, by nails such as 88, plaster board 90 which is exteriorly covered by a layer of plaster 92.

In Fig. 7 is illustrated a manner of securing the members 60 and 62 together without the use of rivets. In this case, the bosses 78 are shown as being spot welded to the web 64 of the opposite member.

In Fig. 8 is illustrated a modification of the present invention particularly adaptable for use as joists or similar members and which, accordingly, is of relatively greater depth than thickness as compared to the construction previously shown. This construction is very similar to that illustrated in Fig. 5 except for the fact that the distance between the curved portions of the web has been extended, thus retaining the ability of the elements to properly receive and retain relatively short nails. In other words the element comprises the oppositely disposed channel members 90 and 92 each including a web 94 and terminal flanges 96 and 98 respectively. The parts 90 and 92 are secured in back-to-back and spaced relationship by means of the bosses or stools 100 and rivets 102 in the same manner as illustrated in Fig. 6. In this particular case, because of the relative depth of the member with respect to its width, it is preferable to bring the web portions 94 into contact with each other substantially along their longitudinal center line and to secure them together in such place. This may be conveniently accomplished as illustrated in Fig. 8 by providing one of the members 94 with an outwardly extending rib portion 104 preferably extending continuously along its longitudinal center line and of a depth equal to the thickness of the slot 106 between the members 90 and 92. The members 90 and 92 are then secured together at spaced points along the ribs 104 by any suitable means such, for instance, as by rivets 108. In order that the web 94 of the member 90 shall properly receive the rivet 108 such web 94 is provided with bosses 110 in line with the rib 104 at the point at which the rivets 108 are located and as clearly illustrated in Fig. 9. In this particular case the rib 104 interrupts the continuity of the slot 106 from one face of the element to the opposite face thereof, but it is to be noted that this offers no objection in cases where the depth of the element is such that there is no possibility of any nails employed in connection therewith of extending as far as such mid-point.

In connection with Fig. 8 it may be noted that a member 112 is shown as being secured to one flanged face thereof by nails such as 114, such nails being shown as of substantially the same diameter as the width of the slot 106. However, it will be apparent to those skilled in this art that in many cases the diameter of the nails employed in connection with the elements herein provided may be substantially less than the thickness of the cooperating slot in the element, and it is to be understood that this is contemplated in the present invention and offers no obstacle to the proper functioning of the same. For instance, in Fig. 8 a member 116 is shown as being secured to that flanged face thereof opposite to that to which the member 112 is secured, and such member 116 is secured in place by nails 118, the diameter of which is shown as being of a diameter substantially half of the thickness of the slot 106. In this case, it will be apparent that the nail 118 is bent in substantially the same manner, if not to a greater proportional extent, than the nail 114 and obviously its holding power will be commensurate with nails of the same diameter driven into wooden structural elements.

In connection with the description of Fig. 5 attention was drawn to the fact that outside of the curved portions 70 and 72 the planes of the web 64 were perpendicular to the plane of the flanges 66 and 68, and the curved portions 70 were both disposed on the same side of the web. Although such structure necessitates different dies or rolls, as the case may be, for the fabrication of the members 60 and 62, it is preferable for a reason illustrated in connection with Fig. 10, which illustrates a structural element very similar to that illustrated in Fig. 5 and the various parts of which are indicated by the same numerals employed in connection with Fig. 5 except such numerals carry a prime mark. It often happens in the fabrication of a building with metal structural elements of the type herein referred to that a wooden nailing strip, facing member or the like, is desired for a side face of one of the elements, and in order to readily take care of such a condition the sides of the element are preferably so proportioned that they may relatively closely receive between opposed flanges thereof a piece of wood of standard dimensions, for instance a two-by-four. Proper workmanship necessarily dictates that the exposed face of such filler member be disposed in perpendicular relationship with respect to the flanged faces of the metallic structural elements and it is therefore desirable that some means be provided in connection with such elements to positively locate such exposed face in its proper position. As illustrated in Fig. 10, where the curved portions 70' both extend in the same direction from the web 64 of the channel member 60', a filler member indicated as at 130 may be inserted between the flanges 66' and 68' of the member 60' with its inner face received in abutting relation with respect to the web 64 thereof and in contact with such web adjacent both the flanges 66' and 68' as well as at the center of the web. Consequently, the contact between such inner face of the member 130 and the web 64 serves to maintain the filler member 130 in its proper position. If it is desired to insert a filler block such as 132 between the flanges 66' and 68' of the channel member 62' such filler member will, in being received between the flanges, abut at its inner face against the outer surfaces of the portions 72' which, being located adjacent their respective flanges and evenly disposed relative to the center line of the web of the channel member 52', will also serve to maintain the member 132 in proper aligned relation with respect to the structural elements.

In connection with structural members of the type herein described and of a size such, that in their normal use, filler members as above described may be occasionally found useful, in order to secure the filler members in place the flanges of the elements may be provided with a series of spaced openings permitting the passage of nails through such flanges into the filler member. For instance such openings are illustrated in Fig. 5 as at 134 and in Fig. 10 as 134', and nails 136 are illustrated as projecting through these openings in the respective flanges and penetrating the filler blocks 130 and 132 respectively, thus securely maintaining the filler blocks in place. However, as such filler blocks are generally employed only in connection with these structural elements of a size suitable for studding, and as the metal from which such sizes of elements are formed is relatively thin, such openings in the flanges may equally well be omitted in manufacture and be formed where and when desired, on the job, by either a hand or prick punch.

A feature illustrated in Fig. 10 and which it is desired to call attention to is the fact that with the construction herein provided, nails of the same length may be employed for securing members of different thicknesses to the elements without affecting the efficiency of the construction. Referring to Fig. 10 it will be noted that to one flanged face of the element is secured a relatively thin member 138 by a nail 140 and to the opposite flanged face of the element is secured a relatively thick member 142 by a nail 144 of identically the same size and length as the nail 140, and it will be observed that the structure is such that the members are efficiently secured in place by the nails.

In passing from Fig. 5 to Fig. 8 the construction disclosed varys from an element of medium depth to one of greater depth. It will be apparent that in some cases elements of less depth than that illustrated in Fig. 5 may be desired such, for instance, as elements of substantially two inches in depth. In such a case the constructions previously described are preferably modified in the manner illustrated in Fig. 11, which illustrates a structural element made up of a pair of opposed channel members indicated generally at 150 and 152 and each comprising a web 154 and end flanges 156 and 158 respectively. In this case, because of the relatively shallow depth of the web 154, the web of one of the channel members is provided with a single outwardly curved portion 160 occupying the greater depth of the web, and the other channel member is provided with an inwardly curved portion 162 complementary to the portion 160. It will be understood, of course, that the two channel members are secured together in back-to-back and spaced relation in any one of the manners hereinbefore described, so as to provide between the web portions 154 a nail receiving slot 164. The effect on nails driven into such slot is obviously substantially the same as in the constructions above described, the only difference being in such case that, because of the relatively shallow depth of the elements, nails such as 166 and 168 driven in from opposite faces of the element in order to secure members such as 170 or 172 thereto, will overlap in end view of the elements. Such overlapping of the nails is of no moment for the reason that seldom, if ever, will two oppositely driven nails ever contact with each other, and if they do contact one or both will be deflected longitudinally of the elements so as not to interfere with the proper retention of both nails.

In the constructions thus far described it will be apparent that the two channel members cooperating to form each of the elements have been of such formation as to require separate dies or rolls for their fabrication. Although as previously described, it is of advantage to so form the members because of greater utility in employing them in fabricating a building structure, it is not to be understood that the invention is thus limited, for acceptable structural elements may be provided in accordance with the present invention and formed from a pair of channel members which are identical to each other and which, accordingly may be formed by the same dies or rolls. Such an element is illustrated in connection with Fig. 12 in which a structural element is disclosed comprising two channel members indicated generally as at 180 and 182 respectively and each comprising a web portion 184 and marginal flanges 186 and 188 at their opposite edges. In this case the web 184 of the channel member 180 is provided with an outwardly bent curved portion 190 adjacent the corresponding flange 186 and an inwardly curved portion 192 adjacent its corresponding flange 188. The channel member 182 is in turn provided with corresponding but complementary curved portions 194 and 196 and the two complementary shaped webs 184 are secured together in spaced relation in a manner previously described to provide between them the sinuous slot 198 in which nails such as 200 may be received to secure a member such as 102 to the elements in substantially the same manner as in the constructions previously described.

It sometimes occurs in the fabrication of buildings that occurrences arise wherein the provision of an element is required to which one or more members may be secured by nailing, and yet the elements need not sustain a substantial load, nor is it necessary that nails be driven into opposite faces thereof. In order to provide an economical structure in such cases what is known as a half-stud may be provided, and one form thereof which is illustrated in Fig. 13. The construction disclosed in this figure amounts, in effect, to one half of the stud disclosed, for instance, in Fig. 5, as will be apparent from an inspection of the figure, and includes a pair of angle members indicated generally as at 210 and 212, each angle member including a web 214 and a flange 216, the webs 214 being secured together in spaced and parallel relation in the manner illustrated in any one of the foregoing figures with the flanges 216 thereof disposed in coplanar relationship so as to provide a supporting and locating surface of material width. One of the webs 214 is outwardly bent as at 218 and the other of the webs 214 is inwardly bent as at 220 in complementary relation to the portion 218 so as to form between them a sinuous slot 222 for the reception of a nail such as 224 in the same manner as previously described in connection with the preceding views.

It will be found advantageous, particularly in and around door frames, window frames or like places to provide structural elements of the general type above described to which wooden or other members may be nailed not only to opposite faces but to a side face thereof, and in a manner different from that illustrated in Fig. 10 for instance. A modification of the present invention to meet such requirements is illustrated in Fig. 4, in which an element is shown as being formed from four cooperating sheet metal channel sectioned members generally indicated as at 230, 232, 234 and 236. These channel sectioned members are so arranged that two adjacent faces of each thereof lie in complementary relation with respect to one face each of two adjacent members, and each pair of complementary side faces are corrugated or bent in the manner previously described in connection with the other figures to provide slots or grooves 238 between them, it being understood that the members are secured together in spaced relation in any one of the manners previously described. From an inspection of Fig. 4 it will be obvious that not only may members such as 240 be secured to opposite flanged faces of the elements by nails 242 in the same manner as in the structures previously described, but in addition an additional wooden or other member 244 may be secured to one or more of the remaining sides by nails such as 246 to close such side.

In most of the above described figures, with the possible exception of Figs. 1 to 4 inclusive, the slot or groove between the opposed channel or angle elements extends inwardly of the corresponding flange faces a short distance in a direction perpendicular to such flange faces, before the curvature of the slot begins. The reason for this is mainly that due to the fact the edges of the dies or rolls which are employed in the fabrication of such elements are the first areas of such dies or rolls to break down, it is usually found that the elimination of curves immediately adjacent such edges aids in extending the life of such dies or rolls. However, it is to be understood that it is preferable, where it can be conveniently attained, that the curved formation of the slot or groove begins immediately inwardly of the flanged faces of the element. Such a construction is illustrated in Fig. 15 and it is to be understood that any of the foregoing constructions may, when desired, be modified in accordance therewith. Referring to Fig. 15 it will be noted that an element is provided comprising two members indicated generally as at 250 and 252 each of which includes a web portion 254 and at least one flange 256, it being understood that the webs 254 are secured together in spaced relation in any of the manners previously described to form between them a sinuous or serpentine slot or groove 258. It will further be observed that the slot or groove 258 begins to curve from a point tangent to the curved corner portions 260 provided between the webs and flanges of the respective members 250 and 252 and which, as previously explained are provided for the purpose of forming a flared guiding mouth for the groove. In this case it will be apparent that bending of a nail such as 262 driven into the slot 258 will commence substantially immediately upon reception of the end of the nail in the slot, and consequently the holding power of the nail will be improved for the reasons previously explained.

As an illustration of the use of some of the structural elements shown in the above described figures of the drawings, a more or less diagrammatic illustration is indicated in Fig. 14, which represents a fragmentary horizontal sectional view taken through a pair of angularly disposed walls of a building. Referring to Fig. 14, the two walls are indicated generally as at A and B and are shown as being disposed at right angles to each other. The wall A includes in the length shown two studs indicated generally as at C and which may be of the same construction as indicated in Fig. 5. These studs are indicated as being spaced a standard distance and the wall B is shown as intersecting the wall A substantially midway between the studs C. Consequently, some means must be provided for supporting the plaster board or lath 270 in that side of the wall A which the wall B intersects and breaks, and in view of the fact that the studs C already provide sufficient strength for the wall at this location, half-studs indicated generally as at D, and which may be of the identical construction illustrated in Fig. 13, are therefore employed for this purpose in the location indicated.

The wall B is provided with a stud indicated generally as at E and which may be of the same construction as that disclosed in Fig. 5. For the further purpose of illustration it is assumed that the wall B is provided with a door opening and consequently an element indicated generaly as at F, and which is shown as of the construction disclosed in Fig. 4, is employed to form one side of the door frame as indicated. It will, of course, be understood that the side portions of the walls A and B may be formed of any conventional lath and plaster construction.

A feature which it is desired to call attention to in summing up the foregoing description, is that due to the construction herein provided, a plurality of nails or similar elements, and which may be of different diameters and lengths, may be driven into the elements in closely adjacent relation without loosening up or materially affecting the holding power of each other, or the strength and efficiency of the element. This is mainly due to the peculiar configuration of the elements of the present invention and the manner in which they cause the nails to bend, first in one direction and then the other, to effect the kink or hump from which the nails derive their holding power. This feature is a decided advantage over many of the heretofore suggested constructions. Furthermore this feature permits a board or other member to be nailed up tightly against the element without the possibility of resulting shake or looseness of the member on the element.

Another feature which the present invention readily lends itself to, is in connection with the use of so called "wall ties" in brick veneer construction. In such types of constructions strips of sheet metal are usually fastened to the frame of the building and extended between different rows of the brick facing to hold the facing properly in place. In metal framed structures heretofore constructed such ties have been wired to the metal frame work, necessitating much time and labor, while in the present construction the ties may be nailed directly to the framework the same as in wooden structures, as will be readily apparent.

As a matter of illustration of the efficiency of the structure of the present invention it may be stated, in conclusion, that comparative tests between a two-by-four size of structural element of the type shown in Fig. 5 and a two-by-six yellow pine joist, using No. 10 box nails in our structural element and No. 8 common nails in the wooden joist, by nailing a board thereto with two of such nails in each case, showed by test that it required approximately 50% greater effort to dislodge the board with our element than in the case with the wooden joist. In addition, in the case of the wooden joist, as soon as the nails began to loosen the holding power of the nails was almost immediately reduced to a negligible amount, while in the case of our element the holding power of the nails was not materially impaired until the nails were drawn out for approximately one-half their length. Inasmuch as No. 10 box nails and No. 8 common nails are generally accepted as having substantially the same holding power in wood, the efficiency of the present invention will be readily recognized. In addition, by reason of the continuance of the holding power of the nails after they have been materially retracted from their fully driven position, as compared to the reduction of the holding power of nails driven into wood under similar circumstances, it will be apparent that the present invention is important in connection with buildings that are liable to become racked, as may occur in earthquake zones, when struck by cyclones, or in similar cases.

From the above it will be seen that the present invention provides an exceedingly efficient, light and economical structural element for construction purposes.

Although several modifications of the present invention are indicated in the drawings it will be apparent to those skilled in the art that many other modifications may be developed in addition to the specific ones here shown and described, and it will be obvious that formal changes may be made in the specific embodiments of the invention herein described without departing from the substance and spirit of the broad invention, the scope of which is commensurate with the appended claims.

We claim:

1. In a metallic structural frame element adapted to receive and hold fastening elements, a pair of metallic channel members rigidly secured together in back-to-back relation with the corresponding sides of said channels in co-planar relation and with the webs spaced from each other for reception of said fastening elements, said webs being corrugated longitudinally thereof in complementary relation, with the ridge of one corrugation extending toward the valley of the complementary corrugation whereby to form between them a curved slot to receive said fastening elements, the shape of the slot defined by the corrugations, the spacing of the webs, and the rigidity of the metallic channel members being such as to cause said fastening elements to bend and thereby be held in position by contact with the sides of said corrugations when driven in between the same transversely thereof.

2. In a metallic structural frame element adapted to receive and hold fastening elements, a pair of metallic channel members rigidly secured together in back-to-back relation with the corresponding sides of said channels in co-planar relation and with the webs spaced from each other for reception of said fastening elements, the webs being corrugated longitudinally thereof in complementary relation, with the ridge of one corrugation extending toward the valley of the complementary corrugation whereby to form between them a curved slot and fastening elements secured in said slot, the shape of the slot defined by the corrugations, the spacing of the webs, and the rigidity of the metallic channel members being such as to cause the fastening elements to be bent and thereby held in position by contact with the sides of said corrugations when driven in between the same transversely thereof.

3. In a metallic structural frame element adapted to receive and hold fastening elements, a pair of metallic channel members rigidly secured together in back-to-back relation with the corresponding sides of said channels in co-planar relation and with the webs spaced from each other for reception of said fastening elements, the webs being corrugated longitudinally thereof in complementary relation, with the ridge of one corrugation extending toward the valley of the complementary corrugation whereby to form between them a curved slot and fastening elements secured in said slot, the shape of the slot defined by the corrugations, the spacing of the webs, and the rigidity of the metallic channel members being such as to cause the fastening elements to be bent and thereby held in position by contact with the sides of said corrugations when driven in between the same transversely thereof and at least a portion of the slot defined between complementary corrugations being displaced laterally of a plane including opposite mouths of the slot by a distance at least as great as the width of the slot.

4. In a metallic structural frame element adapted to receive and hold fastening elements, a pair of metallic channel members rigidly secured together in back-to-back relation with the corresponding sides of said channels in co-planar relation and with the webs spaced from each other for reception of said fastening elements, the webs of said channels each provided with but two major troughs or corrugations, the troughs of one web being complementary to the troughs in the other of said webs whereby to provide a curved slot between said members, the shape of the slot defined by the corrugations, the spacing of the webs and the rigidity of the metallic channel members being such as to cause the fastening elements to be bent and thereby held in position by contact with the sides of said corrugations when driven in between the same transversely thereof, and a minor corrugation in at least one of said webs intermediate of the first mentioned corrugations, abutting the other of said webs.

5. In a metallic structural frame element adapted to receive and hold fastening elements, a pair of metallic channel members rigidly secured together in back-to-back relation with the corresponding sides of said channels in co-planar relation and with the webs spaced from each other for reception of said fastening elements, said webs being corrugated longitudinally thereof in complementary relation, with the ridge of one corrugation extending toward the valley of the complementary corrugation whereby to form between them a slot to receive said fastening elements, the shape of the slot defined by the corrugations, the spacing of the webs, and the rigidity of the metallic channel members being such as to cause said fastening elements to bend and thereby be held in position by contact with the sides of said corrugations when driven in between the same transversely thereof and spaced bosses integral with at least one of said webs for maintaining the spaced relation of said webs.

6. In a metallic structural frame element adapted to receive and hold fastening elements, a pair of metallic channel members rigidly secured together in back-to-back relation with the corresponding sides of said channels in co-planar relation and with the webs spaced from each other for reception of said fastening elements, said webs being corrugated longitudinally thereof in complementary relation, with the ridge of one corrugation extending toward the valley of the complementary corrugation whereby to form between them a slot to receive said fastening elements, the shape of the slot defined by the corrugations, the spacing of the webs, and the rigidity of the metallic channel members being such as to cause said fastening elements to bend and thereby be held in position by contact with the sides of said corrugations when driven in between the same transversely thereof, and said corrugations extending in the same direction relative to the general plane of said slot.

7. In a metallic structural frame element adapted to receive and hold fastening elements, a pair of channel members rigidly secured together in back-to-back relation with the corresponding sides of said channels in co-planar relation and with the webs spaced from each other for reception of said fastening elements, each of said webs being provided with a single longitudinally extending corrugation, said corrugations being in complementary relation, with the ridge of one corrugation extending toward the valley of the complementary corrugation whereby to form between them a curved slot to receive said fastening elements, the shape of the slot defined by the corrugations, the spacing of the webs, and the rigidity of the metallic channel members being such as to cause said fastening elements to bend and thereby be held in position by contact with the sides of said corrugations when driven in between the same transversely thereof.

8. In a metallic structural element for studs, joists, or the like adapted to receive and hold fastening elements of different lengths or different diameters, a pair of metallic channel members secured together in back-to-back relation with the corresponding side flanges of said channel members in co-planar relation to provide a planular bearing surface adapted to receive and directionally locate covering material and with the webs spaced from each other to form an elongated slot for the reception of said fastening elements from either edge thereof for the purpose of securing the covering material in contact with said bearing surfaces, said webs being corrugated longitudinally thereof in complementary relation with the ridge of one corrugation extending into the valley of the complementary corrugation whereby to form between them a curved slot to receive said fastening elements, said corrugations extending in the same direction relative to a plane including opposite mouths of said slot and being confined to the marginal areas of the webs of said channels members, the spacing of the webs, the curvature of the slot defined by the complementary corrugations, and the rigidity of the metallic channel members being such as to cause said fastening elements to bend and thereby be held in position by the sides of said corrugations when driven in between the same transversely thereof.

9. In a metallic structural element for studs or the like, adapted to receive and hold fastening elements, metallic angle members secured together in back-to-back relation and with the flanges of the angle members in co-planar relation to provide a planular bearing surface adapted to receive and directionally locate a covering material and with the backs of said angle members spaced from each other to form an elongated slot between them for the reception of fastening elements of different sizes for the purpose of securing said covering material in contact with said bearing surface, said backs being corrugated longitudinally thereof in complementary relation with the ridge of one corrugation extending toward the valley of the complementary corrugation whereby to form between them a curved slot to receive and retain said fastening elements, the spacing of said backs, the curvature of the slot defined by the complementary corrugations and the rigidity of the metallic angle members being such as to cause said fastening elements to bend and thereby be held in position by the sides of said corrugations, when driven in between the same transversely thereof.

HENRY W. BUELOW.
GEORGE BUELOW.